(No Model.)
O. L. CASTLE.
NUT LOCK.
No. 342,327. Patented May 25, 1886.
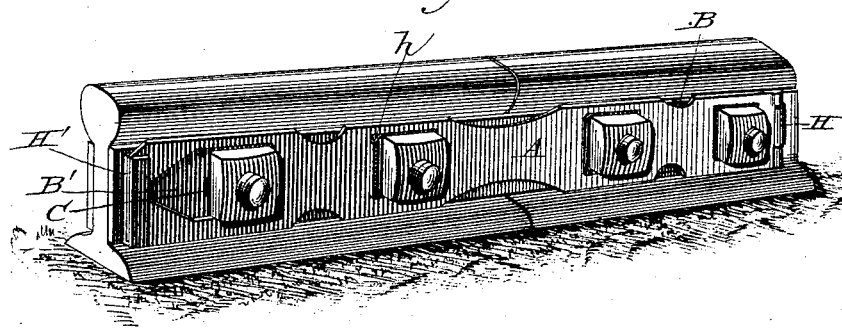
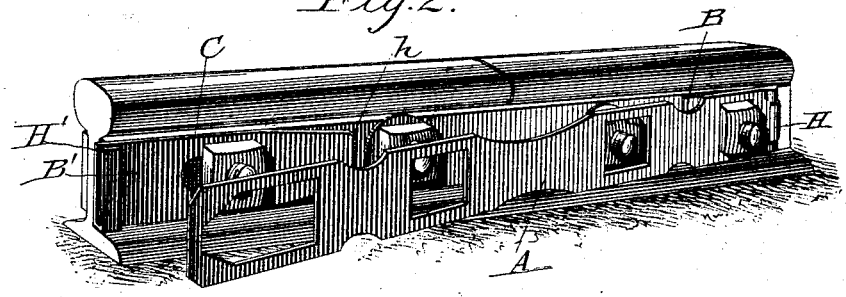
Witnesses:
Inventor:
Orlando Lane Castle.

UNITED STATES PATENT OFFICE.

ORLANDO LANE CASTLE, OF UPPER ALTON, ILLINOIS.

NUT-LOCK.

SPECIFICATION forming part of Letters Patent No. 342,327, dated May 25, 1886.

Application filed February 4, 1886. Serial No. 190,854. (No model.)

*To all whom it may concern:*

Be it known that I, ORLANDO LANE CASTLE, of Upper Alton, in the county of Madison and State of Illinois, have invented a new and useful Improvement in Nut-Locks, which improvement is fully set forth in the following specification and accompanying drawings, in which—

Figure 1 is a perspective of a nut-lock embodying my improvement in its place upon the nuts; and Fig. 2 is a perspective of the same, with the holder detached at one end from the washer and partly removed from its place upon the nuts.

A, Figs. 1 and 2, is a nut-holder, of suitable material, having sockets for receiving the nuts which it is intended to hold, and provided at one end with the base-washer B, with which it is connected by means of the hinge H, while at the other end it is provided with the base-washer B', with which it is connected by means of the clutch H'. Besides the clutch H', the said washer B' is furnished with the hook $h$ at its opposite end, and at its center with an oblong opening, which allows the said washer to slide upon its bolt longitudinally to right and left, so as to bring the clutch H' into engagement with the end of the said holder, and the hook $h$ into engagement with the socket adjacent to itself, thus securing the said washer in its place.

The operation of the device above described is as follows: The washer B having been secured beneath the nut at one end of the series to be held, and the washer B' beneath that at the other end, the holder A is brought down upon the nuts, so that each shall fall into its proper socket, and the detachable end of the said holder shall be in a position to enter the clutch H'. The washer B' is then driven to its inner limit, by which movement the clutch H' is made to receive the said end of the holder A, while the hook $h$, by the natural recoil of the holder thus depressed, is forced into the socket adjacent to itself, thus holding the said washer in its position of engagement with the end of the said holder. The disengagement of the members is readily effected by first springing the holder upward, so as to release the hook $h$, and then sliding the washer to its outer limit, when the said members will again be free, as at first.

It is evident that the same mode of connecting the two members by means of the clutch H', the hook $h$, and the sliding movement of the washer above described may be applied in fastening both ends of the holder, and the hinge H at one end be dispensed with.

What I claim, and desire to secure by Letters Patent, is—

A nut-holder, A, provided at each end and on opposite sides of the nuts to be held with a washer, B and B', respectively, with one of which it is connected by means of a hinge, H, and with the other by means of a clutch, H', and hook $h$, substantially as described, and for the purposes herein set forth.

ORLANDO LANE CASTLE.

Witnesses:
L. M. CASTLE,
JNO. LEVERETT.